J. E. ANDERSON.
HOSE REEL.
APPLICATION FILED APR. 20, 1918.
1,350,205. Patented Aug. 17, 1920.
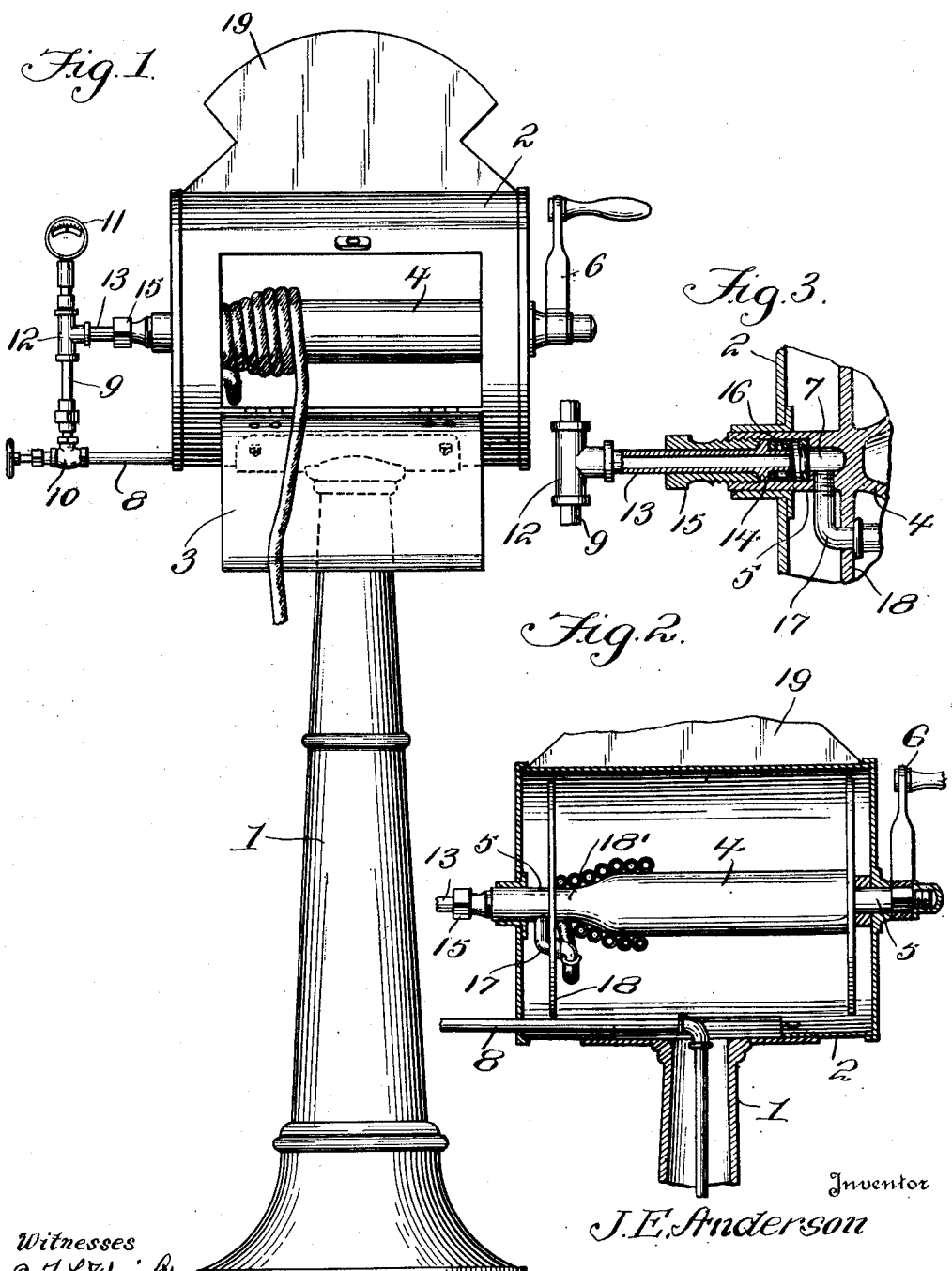
Witnesses
J. L. Wright
L. B. Middleton
Inventor
J. E. Anderson
By 
Attorney

UNITED STATES PATENT OFFICE.

JOHN E. ANDERSON, OF JAMESTOWN, NORTH DAKOTA.

HOSE-REEL.

1,350,205.  Specification of Letters Patent.  Patented Aug. 17, 1920.

Application filed April 20, 1918. Serial No. 229,802.

*To all whom it may concern:*

Be it known that I, JOHN E. ANDERSON, a citizen of the United States, residing at Jamestown, in the county of Stutsman and State of North Dakota, have invented new and useful Improvements in Hose-Reels, of which the following is a specification.

This invention relates to new and useful improvements in reels more particularly adapted for holding the hose used for supplying compressed air to automobile tires.

The improvement consists of a stand adapted to be placed along the curb, within which is located a reel for containing the air hose and an air pipe connected with the reel and engaging one end of the hose for supplying air thereto.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the invention with the door open.

Fig. 2 is a longitudinal section.

Fig. 3 is a detail of the packing means in the journal of the reel.

As shown in these views the device consists of a standard 1 supporting a casing 2 at its upper end, said casing being of cylindrical shape and provided with a door 3. 4 indicates a reel located in said casing and secured to a spindle 5. One end of this spindle extends through one end of the cylindrical casing and is provided with a handle 6 by which the reel may be rotated to wind up the hose. The other end of the spindle projects through the other end of the casing and this end of the said spindle is made hollow to provide a chamber 7. 8 indicates a pipe leading from the air supply and extending from one end of the lower part of the casing. If desired this pipe may extend down through the standard and pass under the sidewalk into the building where it is connected with the air supply. This pipe is coupled to a vertical pipe 9 and a valve 10 controls the passage of air from the pipe 8 into the pipe 9. The pipe 9 is provided with a gage 11 and a T-coupling 12 joins the pipe 9 to a short length of pipe 13 which extends into the chamber 7. This pipe has a collar 14 at its inner end. 15 indicates a nut through which the pipe 13 extends and said nut engages screw threads formed in the chamber 7 whereby the pipe 13 is held within the chamber. The inner edge of said nut is beveled so as to coöperate with the beveled face of the collar 14 to form a packing means to prevent escape of air between the nut and pipe from the chamber 7. 16 indicates a coil spring located between the inner end of the chamber and the collar for pressing said collar on to its seat. The compressed air also tends to hold the collar to its seat. 17 is a tube leading from the chamber 7 through the flange 18 of the reel. Said tube being bent to receive the end of the hose while permitting this end of the hose to lie close to the reel. I may find it desirable to form a recess 18 in the reel adjacent the flange thereof to afford a neat arrangement of the hose on the reel at this end of the device. I may provide a projection 19 on the top of the casing on which may be located any suitable sign or advertisement.

It will be seen that when the valve 10 is open the air will flow from the pipe 8 through the pipes 9 and 13 into the chamber 7 and from this chamber it will flow through the tube 17 into the hose. When the operator of an automobile wishes to use the device it is simply necessary for him to seize the end of the hose and pull the same toward the automobile. This will cause the reel to revolve to permit the unwinding of the hose. It will be seen that the spindle will revolve on the end of the pipe 13 so that the tube 17 will be caused to revolve with the spindle so that the inner end of the hose will revolve with the spindle. When the operator has blown up his tires he may rewind the hose on the reel by means of the handle 6. It will be seen that the hose may be wound up while containing the compressed air and that it is not necessary to unwind the full length of the hose as the air will readily pass through that portion wound around the wheel. It will be seen that the pipe 13 and nut 15 provides an air tight joint while permitting one part to rotate on the other, and this engagement of the parts will keep the beveled contacting portions free of dirt so as to afford at all times a tight fit.

It is thought from the foregoing description that the advantages and novel features of my invention will be readily apparent. I desire it to be understood that I may make changes in the construction and in the combination and arrangement of the several parts, provided that such changes fall within the scope of the appended claim.

What I claim is:—

A device of the character described comprising a hollow standard, a hollow cylindrical casing mounted upon the upper end of the standard and having a door in one side, a reel journaled longitudinally through said casing, a handle on one end of said reel exteriorly of said casing, a hose wrapped upon said reel, the opposite end of the reel from the handle being formed with a bore with which one end of the hose communicates, a supply pipe extending through said standard and disposed laterally through the lower portion of said casing, a connection outside of said casing at the end opposite the handle between the upper end of said supply pipe and the bore of said reel, and a gage associated with said connection.

In testimony whereof I affix my signature.

JOHN E. ANDERSON.